United States Patent [19]
Kock et al.

[11] Patent Number: 6,068,278
[45] Date of Patent: May 30, 2000

[54] METHOD AND APPARATUS FOR CONNECTING SIDE-BY-SIDE RECUMBENT BICYCLES TO FORM A QUADRACYCLE

[76] Inventors: Ronald W. Kock; Jeffrey W. Kock, both of 577 Abilene Trail, Wyoming, Ohio 45215

[21] Appl. No.: 09/182,689

[22] Filed: Oct. 30, 1998

[51] Int. Cl.⁷ .................................................. B62K 13/06
[52] U.S. Cl. ...................... 280/209; 280/288.1; 280/282
[58] Field of Search .................................. 280/209, 282, 280/288.1, 267

[56] References Cited

U.S. PATENT DOCUMENTS

| | | | |
|---|---|---|---|
| 437,026 | 9/1890 | Flachs | 280/209 |
| 442,275 | 12/1890 | Rothgiesser | 280/209 |
| 1,093,466 | 4/1914 | Otter | 280/269 |
| 3,592,486 | 7/1971 | Fox | 280/209 |
| 3,836,175 | 9/1974 | Pomerance et al. | 280/209 |
| 3,902,738 | 9/1975 | Gandrud | 280/209 |
| 4,288,089 | 9/1981 | Thiessen | 280/209 |
| 4,674,762 | 6/1987 | Nelson et al. | 280/282 |
| 5,342,074 | 8/1994 | Amdahl et al. | 280/209 |
| 5,544,906 | 8/1996 | Clapper | 280/288.1 |
| 5,568,935 | 10/1996 | Mason | 280/282 |
| 5,607,171 | 3/1997 | LaBranche | 280/288.1 |
| 5,653,663 | 8/1997 | McCahon | 482/62 |
| 6,022,036 | 2/2000 | Chartrand | 280/209 |

FOREIGN PATENT DOCUMENTS 2059888  4/1981  United Kingdom .................... 280/209

OTHER PUBLICATIONS

Advertisement for "Just Two Bikes", with ref. to U.S. Pat. No. 5,342,074, presumabley available since 1995.
Advetisement from Recumbent Cyclist News 1995 Buyers Guide, pp. 38, 37, 58. Available from P.O. Box 58755, Renton, WA 98058–1755.

*Primary Examiner*—Paul N. Dickson
*Assistant Examiner*—Daniel Yeagley
*Attorney, Agent, or Firm*—Ronald W. Kock

[57] ABSTRACT

A method and apparatus for connecting side-by-side recumbent bicycles to form a quadracycle. The apparatus includes a pair of recumbent bicycles having front wheels and rear wheels. The bicycles have substantially rigid frame members supporting the front wheels and the rear wheels, and the frame members are aligned substantially upright and parallel. The apparatus also includes a single rigid connecting member located between the frame members and attached thereto such that substantially upright planes defined by the frame members always remain substantially parallel. The connecting member has an attachment means to at least one of the frame members such that the frame member rotates relative to the connecting member within a substantially upright plane about the attachment means in order to maintain the front wheels and the rear wheels in contact with an uneven road surface as the quadracycle moves over it.

7 Claims, 3 Drawing Sheets

METHOD AND APPARATUS FOR CONNECTING SIDE-BY-SIDE RECUMBENT BICYCLES TO FORM A QUADRACYCLE

RONALD W. KOCK

JEFFREY W. KOCK

FIELD OF THE INVENTION

The present invention relates to a method and apparatus for connecting bicycles, in a side-by-side orientation such that bicycle frames remain substantially rigid and parallel for steering purposes, yet have compliance to uneven road surfaces so that all four wheels maintain contact therewith. The present invention further relates to a front wheel steering apparatus which also adapts to uneven road surfaces.

BACKGROUND OF THE INVENTION

The capability of seating multiple riders on a bicycle has often been provided by two or more seats mounted serially in-line (front-to-back) between two wheels of the bicycle. This arrangement for two riders is termed "tandem", and generally allows only the front rider to steer the bicycle. A key purpose for riding the same bicycle with another rider is the opportunity for conversation during travel. Such communication is difficult in a serial seating arrangement because the front rider must focus on the road ahead for steering purposes and the rear rider cannot easily hear the front rider because the front rider faces away from the rear rider. Lack of effective communication may also be a significant safety problem because rear riders need to be instructed as to which way to lean when cornering and whether to brake or speed up in various situations controlled by the front rider. Furthermore, rear riders cannot conveniently see what is on the road ahead because their vision is blocked by the front rider. Having no control of direction, unable to effectively converse, and being blocked from forward viewing truly makes a rear rider on an in-line tandem bicycle a second class cyclist.

To solve the communication problem, side-by-side or parallel seating is a preferred arrangement. Motorcycle side cars, for example, provide such an arrangement. Three-wheeled cycles may have side-by-side seating, although tricycles are notoriously unstable during cornering. More recently it has become popular to connect in a side-by-side fashion two independent bicycles to form a quadracycle. Such a combination may include two single-rider bicycles or two in-line tandem bicycles, serving two or four riders, respectively.

Toppling stability of a quadracycle is a function of the spacing of the wheels and the height of the center of gravity of the structure including riders. The greater the spacing of wheels and the lower the center of gravity, the greater the toppling stability. Standard bicycles have high centers of gravity and short wheelbases which, when tied together as a quadrcycle, encourage toppling. Long wheelbase recumbent bicycles, which enable the riders to sit closer to the ground because the riders' legs are extended forward more than downward, provide a low center of gravity. Another benefit of using recumbent bicycles for constructing quadracycles is that handlebars for steering purposes may be located under each rider's seat. Such an arrangement frees up the front of each bicycle for the inclusion of a steering linkage.

The forces applied to a quadracycle are predominantly gravitational forces, which tend to press each wheel of the bicycle downward against the ground. However, there are other forces also present during riding. For example, when cornering, the bicycle frames may tend to tilt from their normal upright orientation. Also during cornering, road friction and centrifugal forces may cause the bicycles to spread apart more at one end than the other end. Tilting and spreading forces must generally be resisted in order for steering to function properly. Prior art quadracycles therefore have multiple rigid connections between bicycles that generate a substantially rigid structure. Such a rigid structure substantially resists deflection from all applied forces and therefore fails to maintain all four wheels on an uneven road surface at all times. Maintaining all wheels in contact with the road surface is essential in order to steer properly and to distribute weight proportionally to each of the four wheels.

It is important for quadracycle steering that side-by-side bicycle frame planes remain substantially parallel. That is, when traveling forward, each bicycle has a substantially upright orientation and each of its two wheels are substantially in-line, thereby occupying two side-by-side upright planes. Even when road surface unevenness is encountered, the substantially upright plane of one bicycle ideally remains substantially parallel to the substantially upright plane of the other bicycle for steering purposes.

It is believed that providing a side-by-side bicycle connecting structure that is rigid enough to maintain parallel upright bicycle frames while providing the vertical compliance necessary to maintain all four wheels in contact with the ground is a problem in quadracycle design that has not been effectively or economically addressed. Independently spring loading of each wheel is one solution, as is done in some automobile suspensions. Spring loading generally requires that one part can move relative to another with a spring in between. Hinges, guide posts, vibration damping, or other moving part restraints are needed in addition to springs, all adding components, and therefore, manufacturing complexity.

Another problem with quadracycles is a need for coordinated steering of two front wheels. For straight ahead travel, both steered wheels should be substantially parallel to the parallel bicycle frames. A great amount of tire frictional drag occurs when steered wheels are aimed incorrectly. For turning corners, the angle of the steered wheel closest to the center of turning should ideally be angled somewhat more than the steered wheel furthest from the center of turning. A problem with such steering is providing a common mechanism for both steered wheels that accomodates the vertical compliance of bicycle frames while maintaining proper wheel alignment.

An object of the present invention is to provide a quadracycle having a single rigid connection member between two bicycles which maintains bicycle frames substantially upright and parallel while providing sufficient bicycle frame vertical compliance to allow all four wheels to continually contact uneven road surfaces during travel, without the use of springs.

Another object of the present invention is to provide a steering linkage sufficiently rigid for steering purposes yet adaptable to relative bicycle frame misalignment when uneven road surfaces are encountered.

SUMMARY OF THE INVENTION

In one aspect of the present invention, a method of connecting side-by-side recumbent bicycles to form a quadracycle includes the step of aligning a first recumbent bicycle substantially upright and parallel to a second recumbent bicycle. The first bicycle has a first substantially rigid frame member supporting a first front wheel and a first rear wheel, and the second bicycle has a second substantially rigid frame member supporting a second front wheel and a second rear wheel. Another step includes connecting the first frame member to the second frame member with a single rigid connecting member placed substantially perpendicular to them. The connecting member is connected to the first and second frame members such that substantially upright planes defined by the first and second frame members always remain substantially upright and parallel. The connecting member has an attachment means to at least one of the first and second frame members that permits the frame member to rotate relative to the connecting member within a substantially upright plane about the attachment means. This allows the first front wheel, the first rear wheel, the second front wheel, and the second rear wheel to all maintain contact with an uneven road surface as the quadracycle moves over it.

In another aspect of the present invention, an apparatus for connecting side-by-side recumbent bicycles to form a quadracycle includes a pair of recumbent bicycles having front wheels and rear wheels. The bicycles have substantially rigid frame members supporting the front wheels and the rear wheels, and the frame members are aligned substantially upright and parallel. The apparatus also includes a single rigid connecting member located between the frame members and attached thereto such that substantially upright planes defined by the frame members always remain substantially parallel. The connecting member has an attachment means to at least one of the frame members such that the frame member rotates relative to the connecting member within a substantially upright plane about the attachment means in order to maintain the front wheels and the rear wheels in contact with an uneven road surface as the quadracycle moves over it.

The single rigid connecting member preferably has a flange at one end substantially parallel to the frame member. The flange has two oversized holes therethrough which are spaced apart at either side of the single rigid connecting member. The frame member has bolt clearance holes therethrough aligned with the oversized holes. The attachment means includes two bolts extending substantially horizontally from the two oversized holes in the flange through the clearance holes in the frame member. The two bolts have nuts clamping the flange to the frame member. The oversized holes permit the bolts to move vertically in order to provide rotation of the frame member about the attachment means in a substantially upright plane.

Alternatively, the at least one frame member has a trunion bearing surface therethrough substantially parallel to the single rigid connecting member. The attachment means includes a trunion extending substantially horizontally from the connecting member through the trunion bearing surface to permit rotation of the frame member about the attachment means in a substantially upright plane.

The front wheels of the quadracycle are each steerable by rotating fork members. The fork members are each rotatably connected to the frame members to support the front wheels. The fork members are preferably connected together via a four bar linkage in order to steer both of the front wheels in unison. The four bar linkage has two crank arms and a connecting rod between crank arms, and the connecting rod has flexible joints where it is attached to the crank arms so that when the frame members of the quadracycle rotate about the attachment means in a substantially upright plane, the flexible joints of the connecting rod adapt to misalignment between the frame members to enable steering when the quadracycle travels over the uneven road surface.

BRIEF DESCRIPTION OF THE DRAWINGS

While the specification concludes with claims which particularly points out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
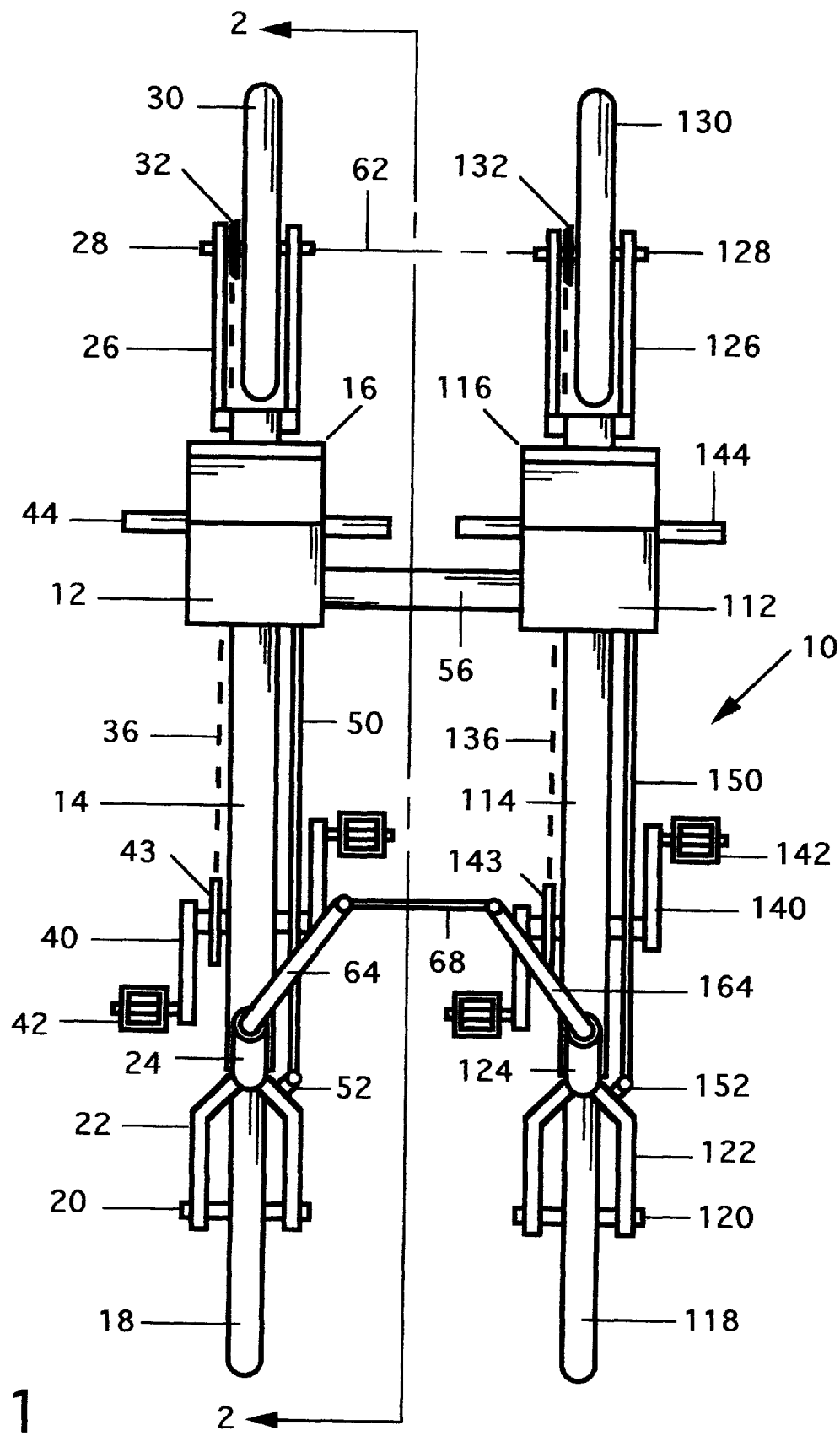
FIG. 1 is a top plan view of a preferred embodiment of the quadracycle apparatus of the present invention, disclosing two recumbent bicycles connected together.
Figure 2:
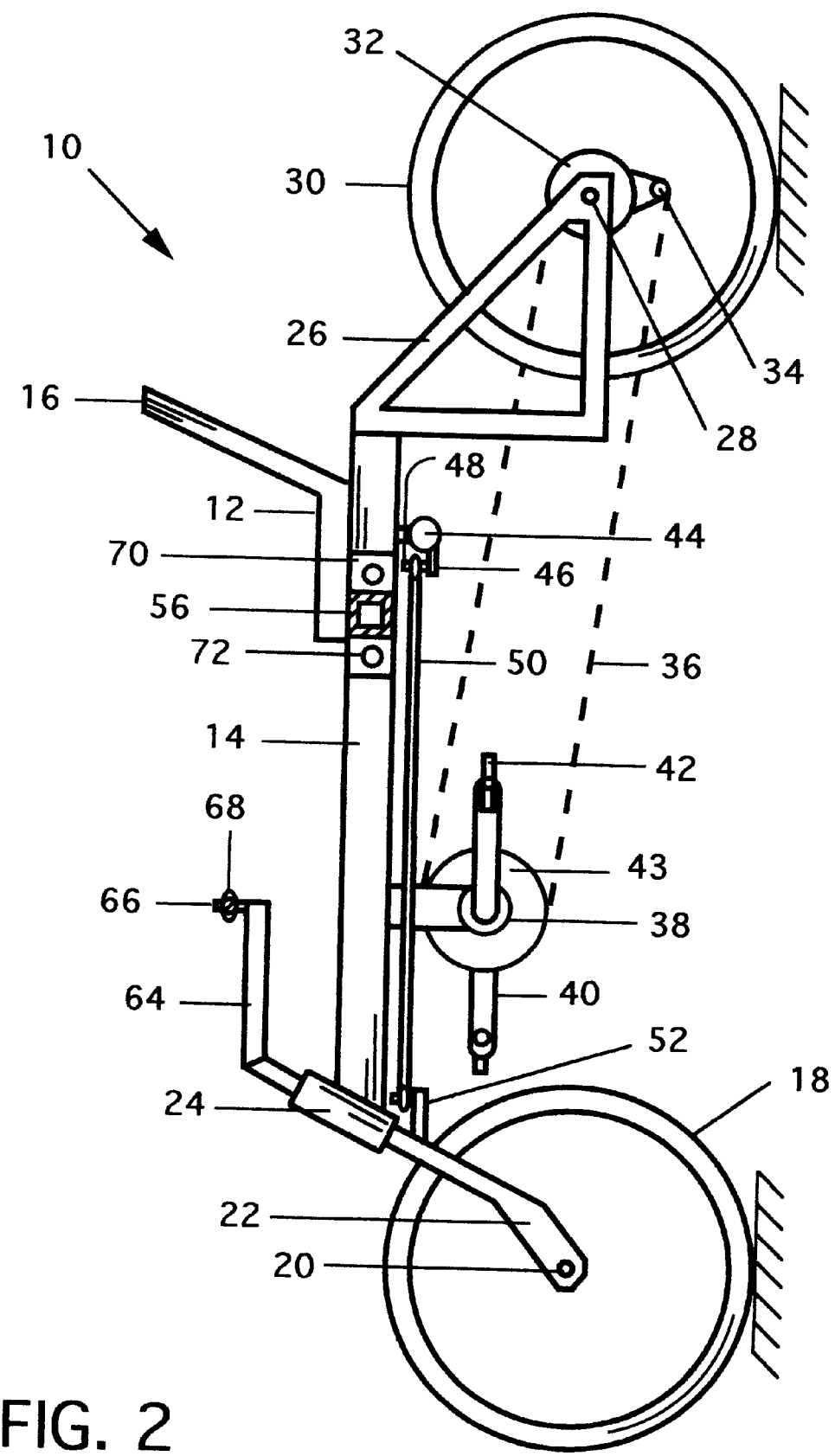
FIG. 2 is a sectioned side elevation view thereof, disclosing a single rigid connecting member with flange connection to the frame member of one of the bicycles.
Figure 3:
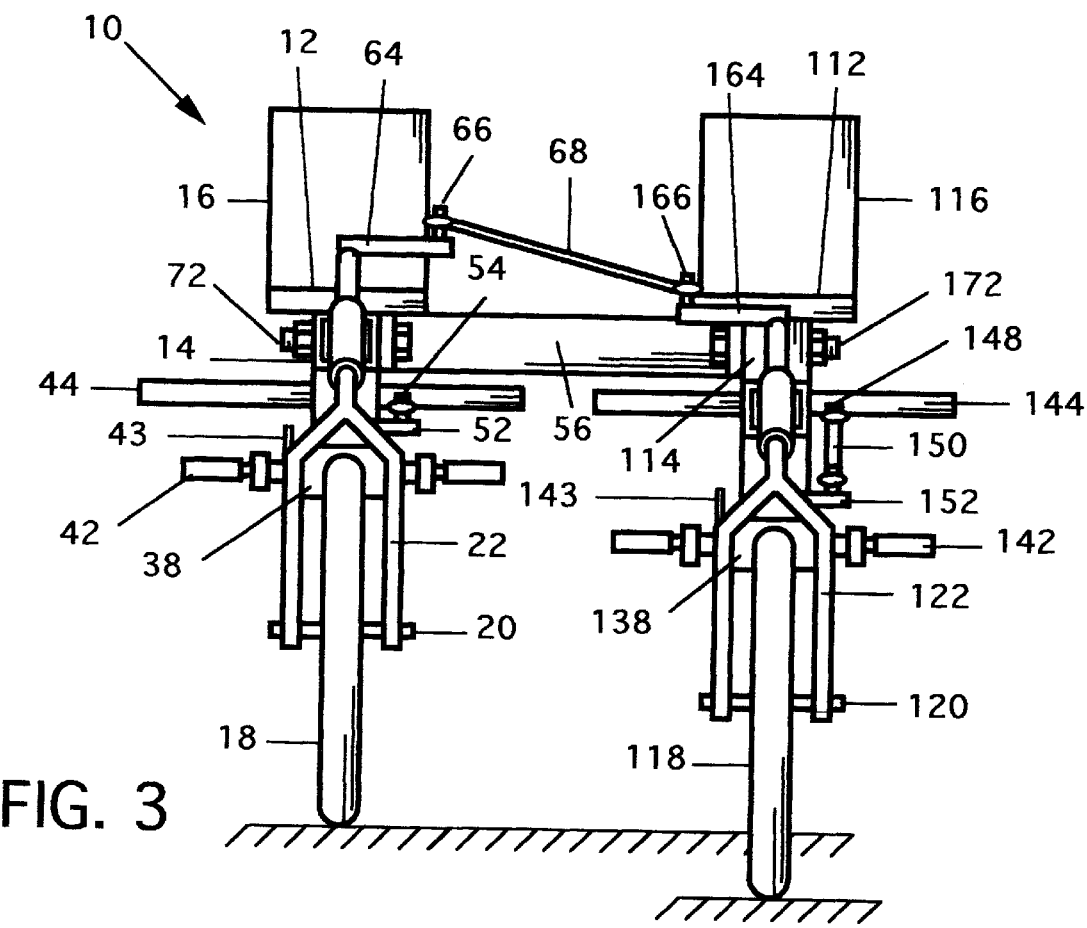
FIG. 3 is a front elevation view thereof, disclosing two front wheels contacting ground surfaces at different elevations, as might be the case on uneven road surfaces.

Referring now to the drawings, and more particularly to FIGS. 1, 2, and 3, there is shown a first preferred embodiment of the quadracycle of the present invention, which is generally indicated as 10. Quadracycle 10 is constructed of two independent recumbent bicycles 12 and 112. Bicycles 12 and 112 are preferably substantially identical, as shown, but may include single seat or in-line tandem recumbent bicycles or dissimilar recumbent bicycles.

First bicycle 12 has a longitudinal frame member 14 onto which is mounted a seat 16 with a back portion. Bicycle 12 also has a front wheel 18 having an axle 20 supported in a fork member 22, which is rotatably supported within bearing housing 24. Housing 24 is connected to one end of frame member 14. At the other end of frame member 14 are a pair of triangular shaped members extending from both sides of frame member 14 to form a yoke 26 for supporting a rear wheel axle 28 about which a rear wheel 30 rotates. Connected to rear wheel 30 are stacked chain sprockets of different diameters, one of which is sprocket 32. Connected to yoke 26 is a derailing mechanism 34 commonly known for shifting a continuous transmission chain 36 from one sprocket to another in order to adjust bicycle pedal crank RPM relative to rear wheel RPM.

Extending downward from frame member 14 is a crank bearing housing 38 which rotatably supports a two-arm crank 40 having pedals 42 connected thereto, as is commonly found on most bicycles. The location of crank 40 near the front wheel of bicycle 12 and horizontally displaced from seat 16 is what characterizes bicycle 12 as a recumbent bicycle. That is, a rider sits on seat 16 with legs extended mostly forward instead of mostly downward, as compared to a standard bicycle. Connected to crank 40 is a single sprocket 43 about which chain 36 is also wrapped to form a drive train between crank 40 and rear wheel 30 for propulsion of bicycle 12 by a rider rotating pedals 42.

Bicycle 12 preferably has a different steering arrangement than a standard bicycle. Pivotally mounted underneath frame member 14 is a handlebar 44, which is preferably located approximately midway under seat 16 and extending perpendicular to frame member 14 when front wheel 18 is parallel to frame member 14. Handlebar 44 has a bracket 46 extending substantially horizontal therefrom about 2 inches from the point where handlebar 44 is pivotally mounted. Extending substantially upright from bracket 46 is a pin 48 to which is rotatably connected one end of a steering link 50. Extending substantially horizontal from fork member 22, about 2 inches from a center of rotation of fork member 22, is a bracket 52 which has extending from it a substantially upright pin 54, to which is rotatably connected the other end of link 50. Link 50 is therefore part of a four bar linkage which enables the rider to steer front wheel 18 by pivoting handlebar 44 about its pivot mounting to frame member 14. The spacing of pin 48 from the handlebar pivot is approximately the same as the spacing of pin 54 from the front fork pivot so that the angle through which the handlebar is turned is substantially the same as the angle through which the front wheel is turned.

Second bicycle 112 has a longitudinal frame member 114 onto which is mounted a seat 116 with a back portion. Bicycle 112 also has a front wheel 118 having an axle 120 supported in a fork member 122, which is rotatably supported within bearing housing 124. Housing 124 is connected to one end of frame member 114. At the other end of frame member 114 are a pair of triangular shaped members extending from both sides of frame member 114 to form a yoke 126 for a rear wheel axle 128 about which a rear wheel 130 rotates. Connected to rear wheel 130 are stacked chain sprockets of different diameters, one of which is sprocket 132. Connected to yoke 126 is a derailing mechanism 134 for shifting a transmission chain 136 from one sprocket to another. Extending downward from frame member 114 is a crank bearing housing 138 which rotatably supports a two-arm crank 140 having pedals 142 connected thereto. Connected to crank 140 is a single sprocket 143 about which chain 136 is also wrapped to form a drive train between crank 140 and rear wheel 130.

Pivotally mounted underneath frame member 114 is a handlebar 144, which is preferably located approximately midway under seat 116 and extending perpendicular to frame member 114 when front wheel 118 is parallel to frame member 114. Handlebar 144 has a bracket 146 extending substantially horizontal therefrom about 2 inches from the point where handlebar 144 is pivotally mounted. Extending substantially upright from bracket 146 is a pin 148 to which is rotatably connected one end of a steering link 150. Extending substantially horizontal from fork member 122, about 2 inches from a center of rotation of fork member 122, is a bracket 152 which has extending from it a substantially upright pin 154, to which is rotatably connected the other end of link 150. Link 150 is therefore part of a four bar linkage which enables the rider to steer front wheel 118 from handlebar 144.

Bicycle 12 is preferably connected to bicycle 112 by a single rigid connecting member 56, which preferably has flanges 70 and 170 at each end which abut frame members 14 and 114. Connecting member 56 is substantially perpendicular to bicycles 12 and 112 so that bicycles 12 and 112 are oriented parallel to each other and upright, preferably with rear axles 28 and 128 being substantially colinear along a substantially horizontal centerline 62.

As hereinbefore discussed, the connection between independent bicycles forming a quadracycle needs to be rigid to prevent tilting or spreading of one bicycle relative to the other for proper steering. The single rigid connecting member of the present invention provides the desired rigidity. However, the benefit of a single connecting member is that its attachment means may serve as a pivot for each bicycle to rotate within a substantially vertical plane in order to maintain all four wheels in contact with an uneven road surface. Multiple connections could not as easily achieve the desired vertical compliance via bicycle frame pivoting and would likely have to rely on springs or some other complex structure for wheel contact compliance.

Flanges 70 and 170 provide for frame pivoting at both ends of single rigid frame member 56, but frame rotation is believed needed only at one end. That is, connecting member 56 could be fixedly attached to frame member 114, for example, and provide compliance only at frame member 14.

When bicycles 12 and 112 are connected by rigid member 56, each bicycle may be independently steered. However, unless front wheels 18 and 118 are steered in unison such that quadracycle 10 corners without tire slippage, significant frictional drag occurs at the road surface contact points of front wheels 18 and 118. It is difficult for two riders to steer in unison without some connection between fork members 22 and 122.

A preferred connection mechanism for steering both bicycles together is a four bar linkage extending rearward from the front wheels and between the bicycles. Attached to the upper end of fork member 22 is a crank arm 64. At the outer end of crank arm 64 is mounted a substantially upright pin 66. Attached to the upper end of fork member 122 is a crank arm 164. At the outer end of crank arm 164 is mounted a substantially upright pin 166. Connecting crank arms 64 and 164, which are preferably of substantially equal length, is a steering connecting rod 68. Connecting rod 68 has bearings such as commercial rod ends at each end, which attach to pins 66 and 166, and provide flexibility for rotation in the four bar linkage plane as well as swivel motion at an angle to each upright pin.

Figure 4:
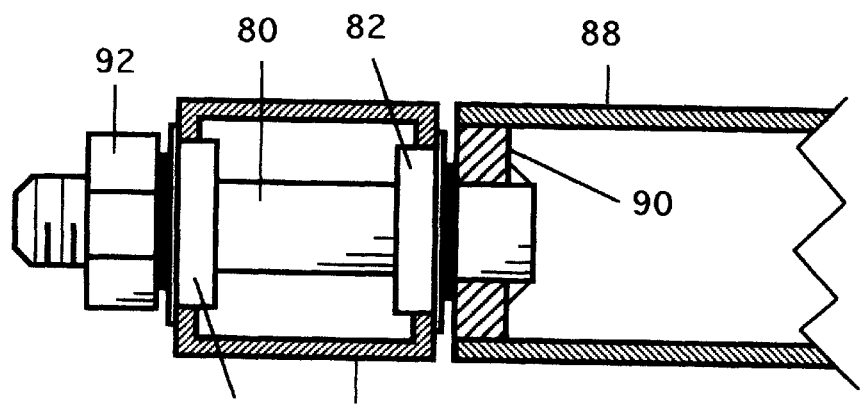
FIG. 4 is a partial front elevation sectioned view of a trunion attachment between a bicycle frame member and the single rigid connecting member.

FIG. 4 shows one approach of many available vertical compliance alternatives using bolts, bearing, hinges, friction disks, torsion bars, etc. In FIG. 4 there is shown a trunion 80 and flanged ball bearings 82 and 84 for enabling a frame member 86 to pivot in a vertical plane at one end of a single rigid connecting member 88. Trunion 80 is preferably a ¾ inch diameter shaft welded to a plug 90 at the end of connecting member 88. Trunion 80 is preferably parallel to and centered in connecting member 88 and extends through and beyond bearings 82 and 84, which are press-fit into opposite sides of frame member 86. Frame member 86 and connecting member 88 are preferably made of 2 inch square steel tubing having a wall thickness of ⅛ inch. Trunion 80 has a threaded external end onto which is placed a hex nut 92 for pulling plug 90 into contact with bearing 82 in order to minimize any wobble between frame member 86 and and connecting member 88. The rotational friction at the trunion and bearing attachment is minimal, allowing for responsive compliance of frame 86 to vertical changes in road surfaces.

Figure 5:
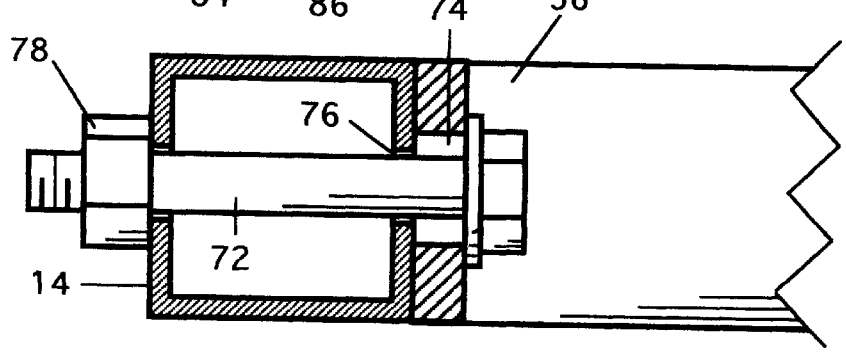
FIG. 5 is a partial front elevation sectioned view of a bolt through a flange having oversized holes for attachment between a bicycle frame member and the single rigid connecting member.

FIG. 5 shows a preferred alternative for providing the desired vertical compliance without sacrificing frame rigidity to tilting or spreading, which is also represented in FIGS. 1, 2, and 3. Connecting member 56 has a perpendicular flange 70 at one end. Flange 70 has two oversized holes 74 spaced apart to either side of connecting member 56. Each oversized hole 74 is preferably ⅝ inch in diameter. Frame member 14 and connecting member 56 are preferably made of 2 inch square tubing having a wall thickness of ⅛ inch. Frame member 14 has four bolt clearance holes 76 aligned with oversized holes 74 so that a pair of 3 inch long ⅜-16 hex head bolts 72 pass therethrough. Bolts 72 have two ⅜-16 hex nuts 78 threaded thereon in order to pull flange 70 snugly against frame member 14. it is important that flange 70 be held snugly against frame member 14 to prevent wobble, tilting, and spreading of the frame members, yet a minimum frictional moment is desired therebetween so that horizontal bolts 72 may move vertically within oversized holes 74 to enable frame 14 to pivot. Lock nuts or other means commonly known can be used to maintain the desired nut position such that the two nuts do not loosen.

The ¼ inch difference between bolts 72 and oversized holes 74, along with a preferred spacing of about 3 inches between holes 74, permits a total angular rotation of frame member 14 of approximately 4.8 degrees. This rotation enables front wheels 18 and 118, for example, to maintain contact with road surfaces that are 4 inches different in elevation. If both ends of connecting member 56 have flanges 70 with oversized holes 74, an elevation difference of 8 inches can be accomodated.

In a most preferred embodiment of the present invention frame member 14 is 4 feet long and connecting member 56 is 2 feet long. Flange 70 is preferably a 2 inch by 4 inch by ¼ inch thick steel plate welded to the end of connecting member 56. Recumbent bicycle 12 is preferably constructed by cutting apart a commercial standard bicycle having 20 inch diameter wheels, such as model 20B6SP, made by Murray, Inc. of Brentwood, Tenn., and which is available from Wal-Mart Stores. Bearing housings 24 and 38 may be welded to frame member 14. Yoke 26 is preferably fabricated with portions of the commercial bicycle frame and then welded to frame member 14. Chain 36 is extended for the recumbent bicycle by adding chain links thereto. The resulting recumbent bicycle preferably has a wheelbase of approximately 7 feet. Steering connecting links and rod 50, 150, and 68 are preferably made of ⅛ NPT galvanized steel pipe, which has an inner diameter which may be tapped ⁵⁄₁₆-24 without the need for tap drilling. At each end of the steering links is threaded therein a commercially available ⁵⁄₁₆ rod end with male stud. Rod ends are available from McMaster-Carr Supply Company of Chicago, Ill. The rod end bearing allows for side-to-side swivel of about 60 degrees. It has been found that for the best steering arrangement, steering crank arms 64 and 164 are about 8 inches long and are angled such that their longitudinal axes intersect at a vertical plane along centerline 62, and half way between rear wheels 30 and 130, when front wheels 18 and 118 are parallel to frame members 14 and 114.

A quadracycle built according to the present invention offers more than the communication benefit lacking with in-line tandem bicycles. Seats 16 and 116 may offer lumbar support for riders' lower backs, and there is no leaning forward on the riders' arms to cause back pain, neck and shoulder pain, or wrist pain. Unlike individual recumbent bicycles, there is no stability problem with the quadracycle, especially at slow speeds. The quadracycle offers both riders the opportunity to steer, and each rider has an unhindered forward view. Also, each rider has an independent drive train which can be pedalled at whatever rate each rider desires. Furthermore, the quadracycle of the present invention is shorter than an in-line tandem bicycle so that it can be more easily transported in the bed of a pickup truck or inside a minivan.

The ideal use of the quadracycle of the present invention is for bike trail touring where the terrain is relatively flat and where conversation and viewing surroundings are more important than achieving high speed. Resort areas having bike paths or streets designated for non-motor powered vehicles are perfect for riding such quadracycles.

One rider may ride quadracycle 10, operating it from seat 16 or seat 116. In fact, the second seat may be removed and replaced with racks for carrying large or bulky articles such as camping gear or golf clubs.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention. For example, oversized holes 74 could just as easily be located in frame member 14 instead of flange 70.

What is claimed is:

1. A method of connecting side-by-side recumbent bicycles to form a quadracycle having toppling stability and compliance to uneven road surfaces while both front wheels are steered through a common steering mechanism, said method comprising the steps of:

a. aligning a first recumbent bicycle substantially upright and parallel to a second recumbent bicycle, said first bicycle having a first substantially rigid frame member supporting a first front wheel and a first rear wheel, said second bicycle having a second substantially rigid frame member supporting a second front wheel and a second rear wheel, said first front wheel and said second front wheel each being steerable by rotating a first fork member and a second fork member, said first and second fork members each being rotatably connected to said first and second frame members to support said first and second front wheels, respectively;

b. connecting said first frame member to said second frame member with a single rigid connecting member placed substantially perpendicular to said first and second frame members, said single rigid connecting member being connected to said first and second frame members such that substantially upright planes defined by said first and second frame members always remain substantially upright and parallel, said single rigid connecting member having an attachment means to at least one of said first and second frame members that permits said at least one of said frame members to rotate relative to said connecting member within a substantially upright plane about said attachment means, said single rigid connecting member having a substantially perpendicular flange at one end substantially parallel to said at least one frame member, said flange having two oversized holes therethrough, said oversized holes being spaced apart to either side of said single rigid connecting member, said frame member having bolt clearance holes therethrough aligned with said oversized holes, said attachment means comprising two bolts extending substantially horizontally and perpendicular to said substantially upright planes defined by said first and second frame members from said two oversized holes in said flange through said clearance holes in said at least one frame member, said two bolts having nuts clamping said flange to said at least one frame member, said oversized holes permitting said bolts to move vertically in order to provide rotation of said at least one frame member about said attachment means so that said first front wheel, said first rear wheel, said second front wheel, and said second rear wheel all maintain contact with an uneven road surface as said quadracycle moves over said uneven road surface; and c. connecting said first and second fork members together via a linkage in order to steer both of said first and second front wheels together in unison, said linkage having flexible joints so that when at least one of said frame members of said quadracycle rotates about said attachment means in a substantially upright plane, said flexible joints of said linkage adapt to misalignment between said first and second frame members to enable steering when said quadracycle travels over said uneven road surface.

2. The method of claim 1 wherein said rotation of said at least one frame member about said attachment means in a substantially upright plane has a total angular rotation limited to about 4.8 degrees such that vertical compliance is provided having an elevation difference of about 4 inches between said front wheels.

3. The method of claim 1 wherein said rotation of said at least one frame member about said attachment means in a substantially upright plane has a total angular rotation limited to about 4.8 degrees such that vertical compliance is provided having an elevation difference of about 4 inches between said front wheels.

4. A combination of side-by-side recumbent bicycles and a connecting member to form a quadracycle having toppling stability and compliance to uneven road surfaces while both front wheels are steered through a common steering mechanism, said combination comprising:

a. a pair of recumbent bicycles having front wheels and rear wheels, said bicycles having substantially rigid frame members supporting said front wheels and said rear wheels, said frame members being aligned substantially upright and parallel, said front wheels each being steerable by rotating fork members, said fork members each being rotatably connected to said frame members to support said front wheels;

b. a single rigid connecting member located between said frame members and attached thereto such that substantially upright planes defined by said frame members always remain substantially parallel, said single rigid connecting member having an attachment means to at least one of said frame members such that said at least one of said frame members rotates relative to said connecting member within a substantially upright plane about said attachment means in order to maintain said front wheels and said rear wheels in contact with an uneven road surface as said quadracycle moves over said uneven road surface, said single rigid connecting member having a substantially perpendicular flange at one end substantially parallel to said at least one frame member, said flange having two oversized holes therethrough, said oversized holes being spaced apart to either side of said single rigid connecting member, said frame member having bolt clearance holes therethrough aligned with said oversized holes, said attachment means comprising two bolts extending substantially perpendicular to said substantially upright plane defined by said at least one frame member from said two oversized holes in said flange through said clearance holes in said at least one frame member, said two bolts having nuts clamping said flange to said at least one frame member, said oversized holes permitting said bolts to move vertically in order to provide rotation of said at least one frame member about said attachment means; and c. a linkage connecting said fork members together in order to steer both of said front wheels together in unison, said linkage having flexible joints so that when at least one of said frame members of said quadracycle rotates about said attachment means in a substantially upright plane, said flexible joints of said linkage adapt to misalignment between said frame members to enable steering when said quadracycle travels over said uneven road surface.

5. The combination of claim 4 wherein said rotation of said at least one frame member about said attachment means in a substantially upright plane has a total angular rotation limited to about 4.8 degrees such that vertical compliance is provided having an elevation difference of about 4 inches between said front wheels.

6. The combination of claim 4 wherein each of said pair of recumbent bicycles has a rider's seat mounted to a longitudinal frame member and a handlebar for steering purposes located under said seat, said handlebar being pivotally connected to said frame member and connected by a linkage to a fork member supporting a front wheel in order to steer said front wheel, said front wheels being steerable in unison by a rider sitting on a seat of either of said pair of recumbent bicycles.

7. A method of connecting side-by-side recumbent bicycles to form a quadracycle having toppling stability and compliance to uneven road surfaces while both front wheels are steered through a common steering mechanism, said method comprising the steps of:

a. aligning a first recumbent bicycle substantially upright and parallel to a second recumbent bicycle, said first bicycle having a first substantially rigid frame member supporting a first front wheel and a first rear wheel, said second bicycle having a second substantially rigid frame member supporting a second front wheel and a second rear wheel, said first front wheel and said second front wheel each being steerable by rotating a first fork member and a second fork member, said first and second fork members each being rotatably connected to said first and second frame members to support said first and second front wheels, respectively;

b. connecting said first frame member to said second frame member with a single rigid connecting member placed substantially perpendicular to said first and second frame members, said single rigid connecting member being connected to said first and second frame members such that substantially upright planes defined by said first and second frame members always remain substantially upright and parallel, said single rigid connecting member having a substantially perpendicular flange at one end substantially parallel to at least one of said first and second frame members, said flange having two bolt clearance holes therethrough, said clearance holes being spaced apart to either side of said single rigid connecting member, said at least one of said frame members having oversized holes therethrough aligned with said clearance holes, and two bolts extending substantially horizontally from said two oversized holes in said at least one of said frame members through said clearance holes in said flange, said two bolts having nuts clamping said flange to said at least one of said frame members, said oversized holes permitting said bolts to move vertically in order to provide rotation of said at least one of said frame members about said single rigid connecting member in a substantially upright plane so that said first front wheel, said first rear wheel, said second front wheel, and said second rear wheel all maintain contact with an uneven road surface as said quadracycle moves over said uneven road surface;

c. connecting said first and second fork members together via a linkage in order to steer both of said first and second front wheels together in unison, said linkage having flexible joints so that when at least one of said frame members of said quadracycle rotates about said single rigid connecting member in a substantially upright plane, said flexible joints of said linkage adapt to misalignment between said first and second frame members to enable steering when said quadracycle travels over said uneven road surface; and d. connecting a rider's seat and a handlebar for steering purposes located under said seat to each of said first and second frame members, each handlebar being pivotally connected to said frame member and connected by a linkage to a fork member supporting a front wheel in order to steer said front wheel, said front wheels being steerable in unison by a rider sitting on a seat of either of said first or second recumbent bicycles.

* * * * *